(12) United States Patent
Onitsuka et al.

(10) Patent No.: US 6,621,038 B2
(45) Date of Patent: Sep. 16, 2003

(54) TORCH FOR POWDER PLASMA BUILDUP WELDING

(75) Inventors: Yoshimi Onitsuka, Tokyo (JP); Minoru Imai, Tokyo (JP)

(73) Assignee: Nippon Welding Rod Co., Ltd., Tokyo (JP)

(*) Notice: Subject to any disclaimer, the term of this patent is extended or adjusted under 35 U.S.C. 154(b) by 0 days.

(21) Appl. No.: 09/956,229

(22) Filed: Jan. 24, 2002

(65) Prior Publication Data

US 2002/0139782 A1 Oct. 3, 2002

(30) Foreign Application Priority Data

Mar. 28, 2001 (JP) .......................... 2001-092333

(51) Int. Cl.[7] .............................................. B23K 10/00
(52) U.S. Cl. ..................... 219/121.45; 219/121.48; 219/121.51; 219/75; 219/121.47
(58) Field of Search ..................... 219/121.47, 76.16, 219/76.15, 123.59, 123.45, 121.48, 121.51; 118/723 DC; 228/119, 125; 239/82–84

(56) References Cited

U.S. PATENT DOCUMENTS

| | | | | |
|---|---|---|---|---|
| 5,328,516 A | * | 7/1994 | Dietiker | 118/723 DC |
| 5,443,201 A | * | 8/1995 | Cartry | 228/119 |
| 5,519,183 A | * | 5/1996 | Meuller | 219/121.52 |
| 5,938,944 A | * | 8/1999 | Baughman et al. | 219/121.47 |
| 6,168,090 B1 | * | 1/2001 | Baker | 239/84 |

FOREIGN PATENT DOCUMENTS

| | | |
|---|---|---|
| JP | 6-109392 | 4/1994 |
| JP | 7-096370 | 4/1995 |

* cited by examiner

*Primary Examiner*—Mark Paschall
(74) *Attorney, Agent, or Firm*—Pearne & Gordon LLP

(57) ABSTRACT

A torch for powder plasma buildup welding capable of readily attaining welding in conformity to any size of a pipe material to be subjected to welding, any configuration thereof and the like. A torch head is replaceably connected to a torch body. The torch body is provided with a gap formation spacer member which is abutted against an inner peripheral surface of the pipe material to keep a distance between an opening of a convergent nozzle of the torch head and the inner peripheral surface of the pipe material substantially constant during buildup welding. Also, the torch body is provided with a deflection restraint spacer member which is abutted against the inner peripheral surface of the pipe material to prevent deflection of the torch body in the pipe material during buildup welding.

14 Claims, 15 Drawing Sheets

TORCH FOR POWDER PLASMA BUILDUP WELDING

BACKGROUND OF THE INVENTION

This invention relates to a torch for powder plasma buildup welding, and more particularly to a powder plasma buildup welding torch wherein a torch head is inserted into a pipe material to be subjected to buildup welding, to thereby carry out the welding on an inner peripheral surface of the pipe material.

A typical torch for powder plasma buildup welding which has been conventionally known or practiced in the art includes a torch head and a torch body for connecting a body of a welding machine such as a power supply or the like and the torch head to each other therethrough and is adapted to carry out buildup welding on an inner peripheral surface of a pipe material. Such a welding equipment is constructed so as to rotate the pipe material while keeping the torch head and a part of the torch body inserted into the pipe material and move the torch head in the pipe material to form a spiral padding on the inner peripheral surface of the pipe material, to thereby attain buildup welding on the pipe material. Such a torch for powder plasma buildup welding is used to carry out buildup welding on an inner surface of a pipe material for a petroleum reaction pipe, an injection molding cylinder or the like using a welding material which has corrosion resistance and wear resistance.

Unfortunately, the conventional powder plasma buildup welding torch must be varied in construction depending on dimensions of a pipe material, a configuration thereof and the like, resulting in handling thereof being troublesome. In a powder plasma buildup welding torch, the torch body is formed of a rigid material, to thereby fail to construct the whole torch in a compact manner, so that transport of the torch is troublesome. This renders repairing of the torch head highly hard when any failure or trouble occurs in the torch head.

SUMMARY OF THE INVENTION

The present invention has been made in view of the foregoing disadvantage of the prior art.

Accordingly, it is an object of the present invention to provide a torch for powder plasma buildup welding which is capable of being readily handled irrespective of dimensions of a pipe material, a configuration thereof and the like.

It is another object of the present invention to provide a torch for powder plasma buildup welding which is capable of facilitating repairing of a torch head when it fails or breaks down.

It is a further object of the present invention to provide a torch for powder plasma buildup welding which is capable of restraining a variation in distance between an opening of a convergent nozzle of a torch head and an inner peripheral surface of a pipe material to be subjected to welding, to thereby form a padding uniform in size thereon.

It is still another object of the present invention to provide a torch for powder plasma buildup welding which is capable of preventing leaping of a torch body.

In accordance with the present invention, a torch for powder plasma buildup welding is provided. The torch includes a torch head adapted to be inserted into a pipe material of a continuous length to carry out buildup welding on an inner peripheral surface of the pipe materiall and a torch body formed into a continuous length and having the torch head mounted on a distal end thereof. The torch head is replaceably connected to the torch body. Such construction permits buildup welding to be attained in conformity to any size of a pipe material to be subjected to welding, any configuration thereof and the like. Thus, the present invention facilitates application of the torch to welding while eliminating replacement of the whole powder plasma buildup welding torch required in the prior art. Also, when any failure or trouble occurs in the torch head, the torch head may be readily repaired because it is detached from the torch body.

In general, the torch head includes a convergent nozzle having an opening. In a preferred embodiment of the present invention, either torch head or torch body is provided with a gap formation spacer member which is abutted against the inner peripheral surface of the pipe material to keep a distance between the opening of the convergent nozzle of the torch head and the inner peripheral surface of the pipe material substantially constant when welding takes place. Such arrangement of the gap formation spacer member in the torch effectively prevents a variation in distance between the opening of the convergent nozzle of the torch head and the inner peripheral surface of the pipe material subjected to welding due to a weight of the torch head and/or deflection of the torch body, to thereby ensure formation of a padding of a uniform size on the inner peripheral surface of the pipe material.

An increase in length of the torch body tends to cause it to be deflected in the pipe material during buildup welding. In particular, arrangement of the gap formation spacer member causes leaping of the torch body during rotation of the pipe material depending on abutment between the gap formation spacer member and the inner peripheral surface of the pipe material, leading to an increase in deflection of the torch body. In view of such a disadvantage, the torch body is preferably provided with at least one deflection restraint spacer member adapted to be abutted against the inner peripheral surface of the pipe material so as to prevent deflection of the torch body in the pipe material during buildup welding.

More specifically, in accordance with the present invention, a following torch for powder plasma buildup welding is provided. The torch includes a torch head adapted to be inserted into a pipe material of a continuous length to carry out buildup welding on an inner peripheral surface of the pipe material and a torch body formed into a continuous length and having the torch head mounted on a distal end thereof. The torch body includes a connection pipe and a plurality of pipes arranged in said connection pipe. The plurality of pipes feed cooling water, gas and the like to said torch head, respectively. The plurality of pipes include two or more pipes made of an electrically conductive material. One of the two or more pipes constitutes a first conductive portion electrically connected to one of electric poles of a DC power supply and another of the two or more pipes constitutes a second conductive portion electrically connected to the other of said electric poles. The torch head includes a bar-like electrode, an electrode support made of an electrically conductive material and arranged for supporting the bar-like electrode, a convergent nozzle made of an electrically conductive material, a nozzle support made of an electrically conductive material and arranged for supporting said convergent nozzle, and a head-side insulation member arranged between the electrode support and the nozzle support to electrically insulate the electrode support and nozzle support from each other. The head-side insulation member includes a projection portion projecting beyond the electrode support and nozzle support and toward the torch body. The connection pipe of the torch body is fixedly provided on an end thereof defined on a side of the torch head with an insulation flange. The insulation flange is attached with a connection member. The connection member includes a first connection member half and a second connection member half which are arranged so as to be spaced from each other through a cavity defined therebetween and fitted with the projection portion. One of the two or more pipes mentioned above is connected with the first connection member half through the insulating flange. Another of the two or more pipes mentioned above is connected with the second connection member half through the insulating flange. The electrode support is contacted with the first connection member half. The nozzle support is contacted with the second connection member half. The torch head is replaceably connected to the torch body by means of a plurality of bolts for fixing the torch head and connection member to each other.

The torch of the present invention thus constructed facilitates detachable connection between the connection member and the torch head by tightening and releasing of the bolts. This permits the torch head to be replaceably connected to the torch body by means of bolts. Also, connection between the connection member and the torch head leads to joining between the first connection member half and the electrode support, so that a current may be fed from one of electric poles of a power supply (a body of a welding machine) through one of the two or more pipes constituting a first conductive portion, the first connection member half and the electrode support to the bar-like electrode. Also, connection between the connection member and the torch head permits the second connection member half and nozzle support to be joined together, so that a current may be fed from the other electric pole of the power supply (the body of the welding machine) through another of the two or more pipes constituting a second conductive portion, the second connection member half and the nozzle support to the convergent nozzle.

In this invention, particularly, the head-side insulation member includes the projection portion. Thus the positioning between the torch head and the torch body is easily performed only by fitting the projection portion into the cavity defined between the first connection member half and the second connection member half. The connection member may be attached with the insulation flange by means of the bolts for fixing the torch head and the connection member to each other. This permits the torch head, the connection member and the insulation flange to be fixed together by means of a small number of bolts.

In a preferred embodiment of the present invention, the first connection member half and the second connection member half each are formed with a plurality of connection member-side bolt insertion through-holes. The flange is formed with a plurality of flange-side bolt insertion through-holes aligned with the connection member-side bolt insertion through-holes, respectively. The flange-side bolt insertion through-holes each include a large diameter portion receiving therein each head of the bolts and a small diameter portion receiving therein each shank of the bolts. The electrode support and the nozzle support each are formed with a plurality of threaded holes aligned with the connection member-side bolt insertion through-holes, respectively. The torch head is detachably connected to the torch body by means of bolts threadedly fitted in the threaded holes of the torch head through the connection member-side bolt insertion through-holes and flange-side bolt insertion through-holes. Such construction permits the connection member and torch head to be connected to each other by inserting bolts through the connection member-side bolt insertion through-holes and flange-side bolt insertion through-holes and threadedly fitting the bolts in the threaded holes of the torch head. Release of the bolts leads to separation of the connection member and torch head from each other.

In a preferred embodiment of the present invention, the insulation flange is formed with flange-side through-holes via which the pipes of the torch body extend and the connection member is formed with fit holes which communicate with the flange-side through-holes and in which the pipes are fitted and communication holes which communicate with the fit holes and are open on a side of the torch head. The torch head is formed with in-head passages aligned with the communication holes. The torch head is connected to the torch body so that the communication holes and in-head passages may communicate with each other at communication portions therebetween. Thus, connection between the connection member and the torch head leads to communication between the communication holes and the in-head passages, so that a current, cooling water, gas and the like may be fed from the body of the welding machine to the torch head.

In a preferred embodiment of the present invention, the communication portions, at which the communication holes and in-head passages communicate with each other, each are sealed at a peripheral edge thereof with an O-ring which is arranged at an opening of each of the communication holes on a side of the torch head or an opening of each of the in-head passages on a side of the connection member. This permits the peripheral edge of the communication portion between the communication holes and the in-head passages to be effectively sealed with the O-ring compressed due to tightening of the bolts.

In a preferred embodiment of the present invention, the torch body is provided on an end thereof defined on a side of the torch head with an above-mentioned gap formation spacer member and the torch body is provided with an above-mentioned deflection restraint spacer member.

The gap formation spacer member may be constructed in any desired manner. For example, the gap formation spacer member may include an upper head support half and a lower head support half which are combined with each other to circumferentially surround the torch body. In this instance, the lower head support half may include a lower body portion for circumferentially surrounding a lower portion of the torch body and a lower projection portion arranged so as to vertically downwardly project from the lower body portion, resulting in being abutted against the inner peripheral surface of the pipe material. The upper head support half may include an upper body portion for circumferentially surrounding an upper portion of the torch body and an upper projection portion arranged so as to project from the upper body portion in a radial direction of the pipe body, resulting in being abutted against the inner peripheral surface of the pipe material. The upper projection portion may have, to the lower projection portion, positional relationship which is set to restrain a variation in distance between the torch head and the inner peripheral surface of the pipe material during welding.

In a preferred embodiment of the present invention, the lower projection portion includes a projection body threadedly coupled to the lower head support half and a ball member supported in the projection body in a rollable manner (hereinafter also referred to as "rollably") so as to be abutted against the inner peripheral surface of the pipe material. This permits rotation or rolling of the ball member to reduce friction between the lower projection portion and the inner peripheral surface of the pipe material, to thereby reduce deflection of the torch body in the pipe material during buildup welding.

In a preferred embodiment of the present invention, the insulation flange is formed into a cylindrical configuration and constitutes the gap formation spacer member. In this instance, the insulation flange may be abutted against the inner peripheral surface of the pipe material. This eliminates a necessity of providing the gap formation spacer member separately and simplifies a structure of the gap formation spacer member.

The deflection restraint spacer member may be likewise constructed in any desired manner. For example, the deflection restraint spacer member may include an upper body support half and a lower body support half which are combined with each other to circumferentially surround the torch body, as well as an abutment member arranged so as to vertically downwardly project from the lower body half, resulting in being abutted against the inner peripheral surface of the pipe material. The abutment member may be formed into a plate-like shape and arranged so as to extend in a longitudinal direction of the pipe material to be welded. Also, the deflection restraint spacer member may be constituted by a cylindrical member. The cylindrical member may include a first body support half and a second body support half which are combined with each other to circumferentially surround the torch body.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a torch for powder plasma buildup welding according to the present invention will be described with reference to the accompanying drawings.

Figure 1:
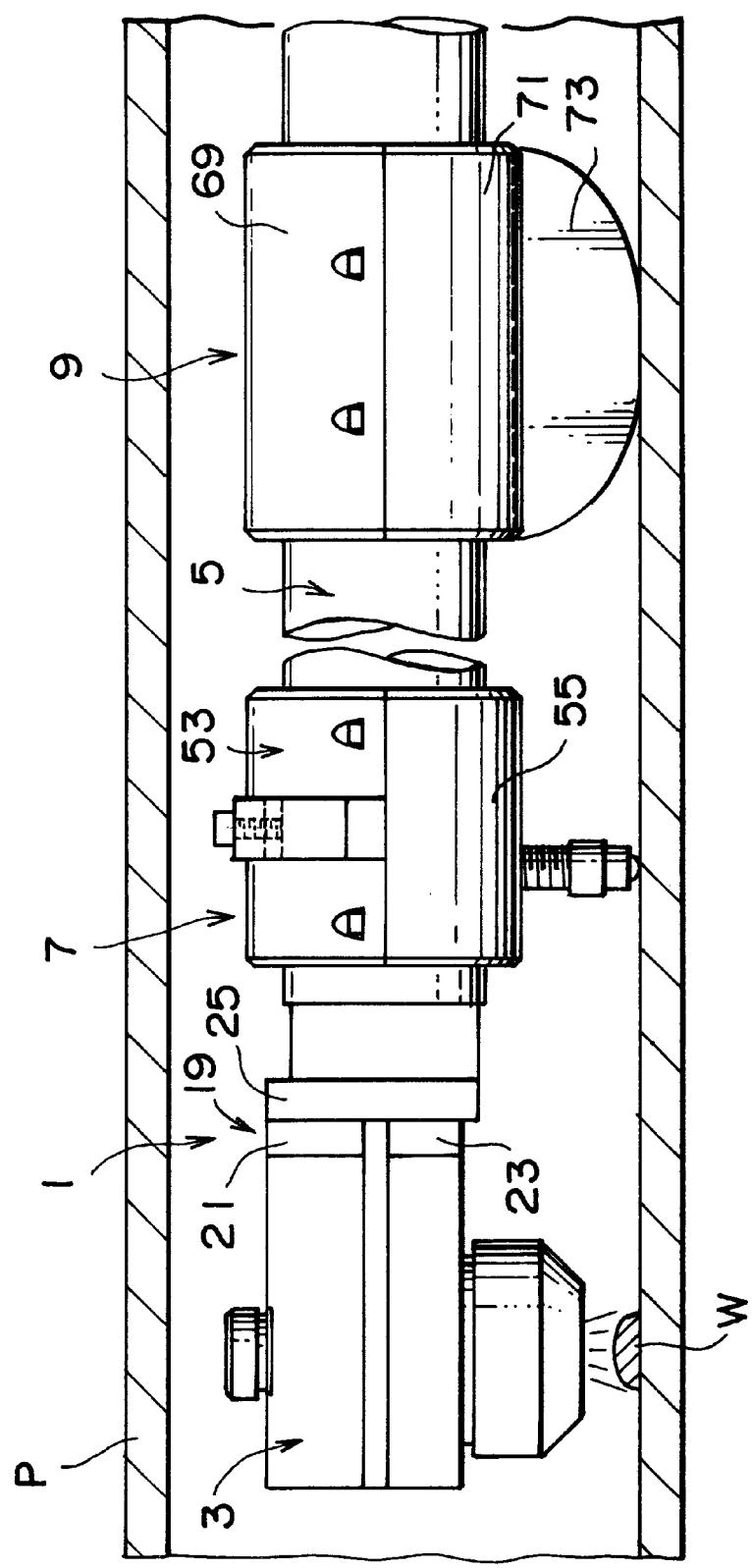
FIG. 1 is a schematic view showing a manner of buildup welding on an inner peripheral surface of a pipe material in accordance to an embodiment of a torch for powder plasma buildup welding according to the present invention.
Figure 2:
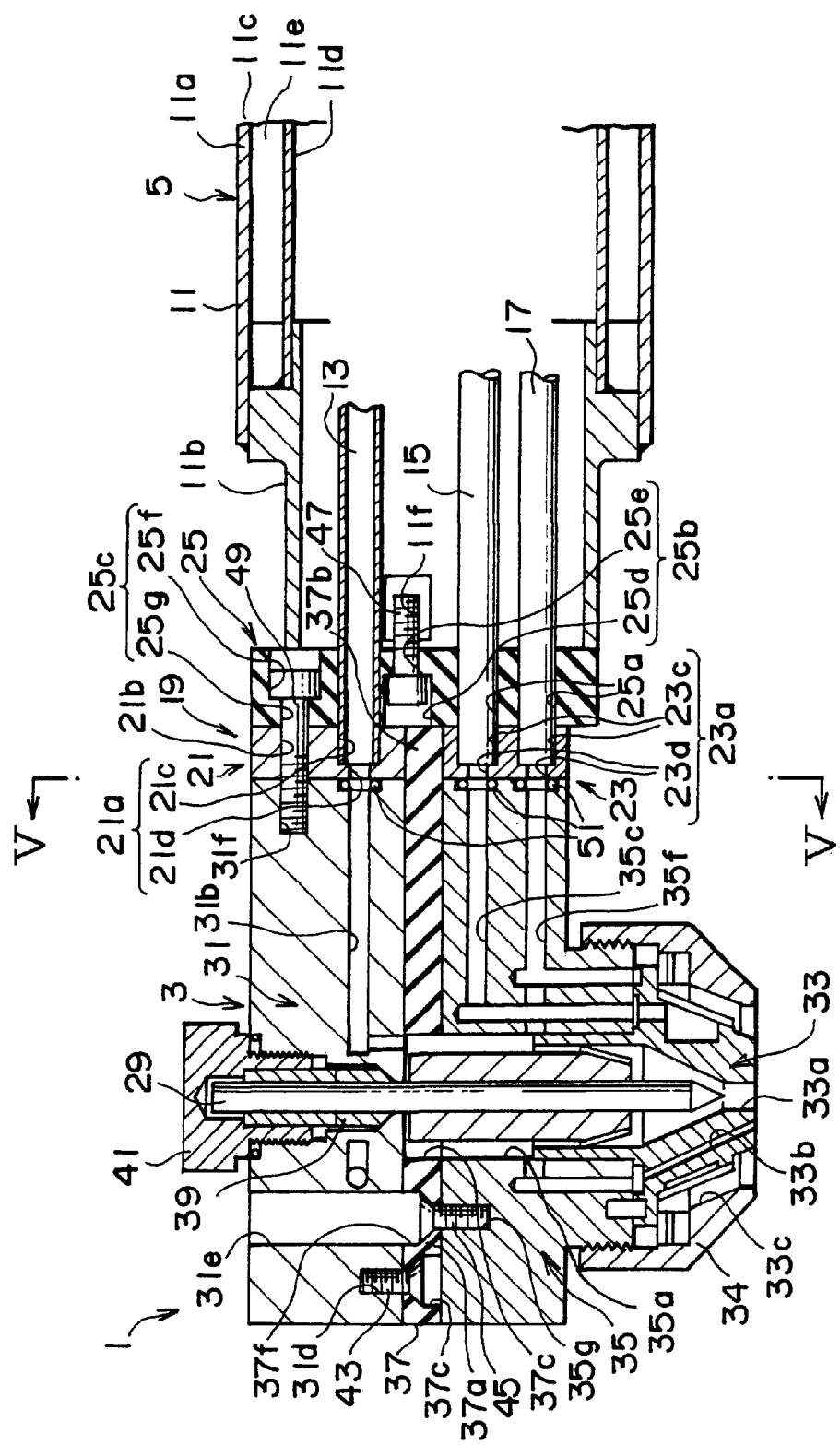
FIG. 2 is a sectional view showing a structure around a torch head incorporated in the torch for powder plasma buildup welding shown in FIG. 1.
Figure 3:
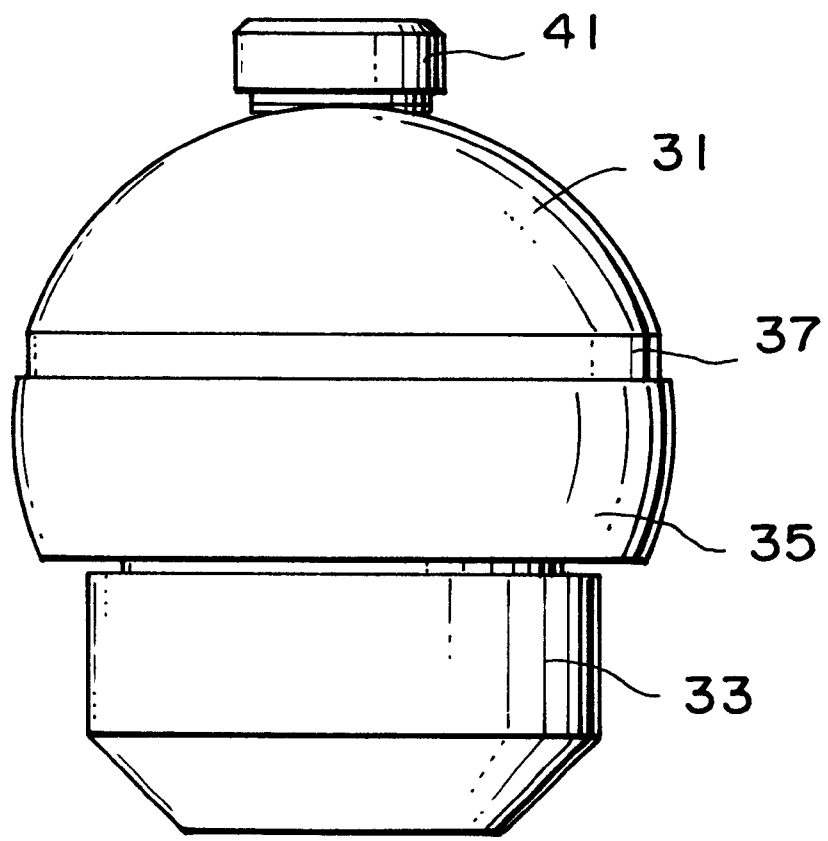
FIG. 3 is a front elevation view showing a torch head incorporated in the torch for powder plasma buildup welding of FIG. 1.

Referring first to FIG. 1, a manner of buildup welding on an inner peripheral surface of a pipe material carried out in accordance with an embodiment of a torch for powder plasma buildup welding according to the present invention is illustrated. A torch for powder buildup welding of the illustrated embodiment which is generally designated at reference numeral 1 in FIG. 1 includes a torch head 3, a torch body of a continuous length, a gap formation spacer member 7, and a 5 deflection restraint spacer member 9. The torch head 3 and a part of the torch body 5 are inserted into a pipe material P of a continuous length to be subjected to buildup welding. Then, the pipe material P is rotated and the torch head 3 is moved in the pipe material P, so that buildup welding is carried out on an inner peripheral surface of the pipe material P to form a spiral padding W thereon. In the illustrated embodiment, the pipe material P is formed into an inner diameter of 120 mm. The torch body 5, as shown in FIG. 2, includes a connection pipe 11 and pipes 13, 15 and 17 arranged in the connection pipe 11 so as to flow a DC current, gas and the like therethrough. This results in a DC current, gas and the like being fed from a body of a welding machine (not shown) to the torch head 3. In the illustrated embodiment, the torch body 5 is formed into a length of about 5 m. Eight such pipes are arranged so as to feed a DC current, gas and the like therethrough to the torch head 3. However, only three pipes 13, 15 and 17 are shown in FIG. 2 for the sake of brevity. The connection pipe 11 includes a pipe body 11a and a small-diameter end portion or an end portion reduced in diameter as compared with the pipe body which is designated at reference character 11b. The end portion 11b is arranged on an end of the pipe body 11a defined on a side of the torch head 3. The pipe body 11a includes an outer wall section 11c and an inner wall section 11d, to thereby be constructed into a double-wall structure. Between the outer wall section 11c and the inner wall section 11d is formed a waterway 11e.

The torch head 3, as shown in FIGS. 2 to 5, is connected through a first connection member half 21 and a second connection member half 23 constituting a connection member 19 described above, and an insulation flange 25 to the connection pipe 11 and includes a bar-like electrode 29, an electrode support 31 for supporting the bar-like electrode 29 therein, a convergent nozzle 33, a nozzle support 35 for supporting the convergent nozzle 33 therein and a head-side insulation member 37. The bar-like electrode 29 is supported in the electrode support 31 through a collet 39 for adjusting centering of the bar-like electrode 29 and a collet holder 41.

Figure 4:
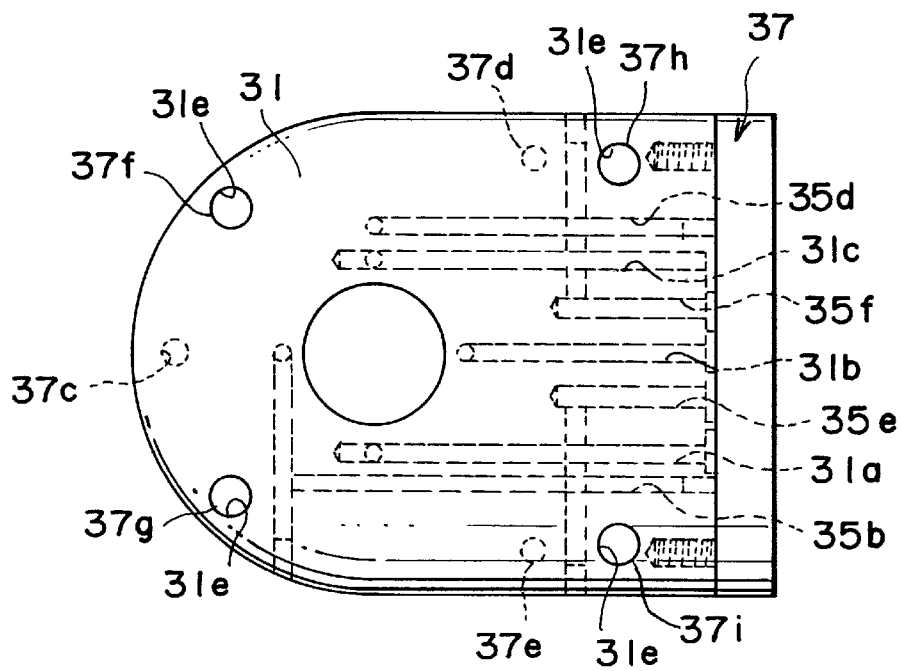
FIG. 4 is a plan view showing a torch head incorporated in the torch for powder plasma buildup welding of FIG. 1.
Figure 5:
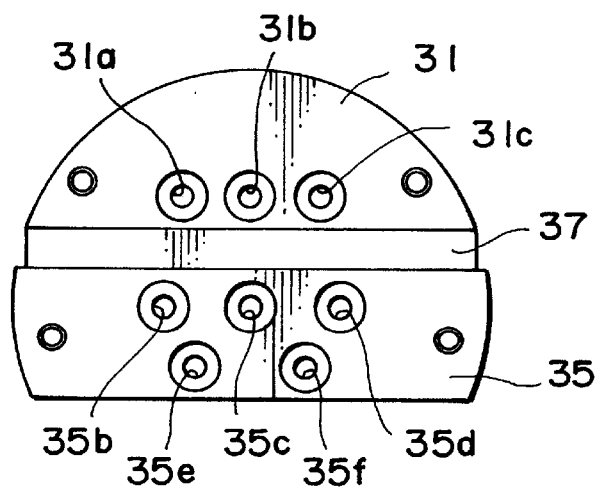
FIG. 5 is a rear view showing a torch head incorporated in the torch for powder plasma buildup welding of FIG. 1.

The electrode support 31 is made of an electrically conductive material and, as shown in FIGS. 4 and 5, is formed therein with an in-head passage 31a for feeding cooling water, an in-head passage 31b for plasma gas and an in-head passage 31c for discharging cooling water. The cooling water feed in-head passage 31a and cooling water discharge in-head passage 31c are arranged so as to communicate with a first cooling water feed pipe (not shown) of the torch body 5 and a first cooling water discharge pipe (not shown) of the torch body through a communication hole 21d of the first connection member half 21, respectively. This permits cooling water fed from a side of a body of a welding machine through the first cooling water feed pipe and cooling water feed in-head passage 31a to the electrode support 31 to be returned through the cooling water discharge in-head passage 31c and first cooling water discharge pipe to the side of the body of the welding machine after cooling a peripheral region of an upper portion of the bar-like electrode 29. Also, the first cooling water feed pipe in the torch body 5 connected to the cooling water feed in-head passage 31a constitutes a first conductive portion electrically connected to a negative electric pole of a DC power supply of the body of the welding machine. Such construction permits a current to be fed from the DC power supply through the first cooling water feed pipe (the first conductive portion), first connection member half 21, electrode support 31, collet holder 41 and collet 39 to the bar-like electrode 29. The plasma gas in-head passage 31b is arranged so as to communicate at one end thereof with the plasma pipe 13 of the torch body 5 through the communication hole 21d of the first connection member half 21 and communicate at the other end thereof to a through-hole 37c formed through a central portion of the head-side insulation member 37 and a through-hole 35a formed through a central portion of the nozzle support 35. Such construction results in plasma gas fed from the side of the body of the welding machine through the plasma gas pipe 13 and plasma gas in-head passage 31b being fed to a peripheral area at a distal end of the bar-like electrode 29 via the through-holes 37c and 35a.

The convergent nozzle 33 is formed into a cylindrical shape while being gradually reduced in diameter toward a distal end of the bar-like electrode 29. Also, the convergent nozzle 33 is supported in the nozzle support 35 in a manner to surround the bar-like electrode 29 while being spaced at a predetermined interval from the bar-like electrode 29. Further, the convergent nozzle 33 has a shield cap 34 arranged therearound while being threadedly fitted in the nozzle support 35.

The nozzle support 35 is made of an electrically conductive material as in the electrode support 31 and formed therein with a through-hole 35a in a manner to extend through a central portion thereof, in which the bar-like electrode 29 is partially arranged. Also, the nozzle support 35, as shown in FIGS. 4 and 5, is formed therein with a first in-head passage 35b for a powder, an in-head passage 35c for shield gas, a second in-head passage 35d for a powder, an in-head passage 35e for feeding cooling water, and an in-head passage 35f for discharging cooling water. The first powder in-head passage 35b and second powder in-head passage 35d are arranged so as to communicate at one end thereof through a communication hole 23d of the second connection member half 23 to first and second powder pipes (not shown) of the torch body 5, respectively. Also, the first and second powder in-head passages 35b and 35d communicate at the other end thereof with a powder hole 33b. This results in a powder which is fed from the body side of the welding machine through the powder pipes and in-head passages 35b and 35d being fed through the powder hole 33b into an arc column discharged between bar-like electrode 29 and the pipe material P. The shield gas in head passage 35c is arranged so as to communicate at one end thereof with the shield gas pipe 15 of the torch body 5 through the communication hole 23d of the second connection member half 23 and at the other end thereof with a shield gas hole 33c. This permits shield gas fed from the body side of the welding machine through the shield gas pipe 15 and shield gas in-head passage 35c to be fed around the arc column. The cooling water feed in-head passage 35e is arranged so as to communicate the communication hole 23d of the second connection member half 23 to a second cooling water feed pipe (not shown) of the torch body 5 and the cooling water discharge in-head passage 35f is arranged so as to communicate through the communication hole 23d of the second connection member half 23 to the second cooling water discharge pipe 17 of the torch body 5, so that cooling water fed from the body side of the welding machine through the second cooling water feed pipe and cooling water feed in-head passage 35e may be returned to the body side of the welding machine through the cooling water discharge in-head passage 35f and second cooling water discharge pipe 17 after it cools a periphery of a lower portion of the bar-like electrode 29. Also, the second cooling water feed pipe of the torch 5 connected to the cooling water in-head feed passage 35e constitutes a second conductive portion electrically connected to a positive electric pole of the DC power supply on the body side of the welding machine. This permits the convergent nozzle 33 to be fed with a current from the positive pole through the second cooling water feed pipe (the second conductive portion), second connection member half 23 and nozzle support 35. Thus, a so-called pilot arc is generated between a distal end of the bar-like electrode 29 electrically connected to the negative pole and the convergent nozzle 33 electrically connected to the positive pole during welding.

The head-side insulation member 37 is formed of an insulating material such as a ceramic material or the like which has a plate-like configuration and arranged between the electrode support 31 and the nozzle support 35 to insulate both from each other. The head-side insulation member 37 includes an insulation portion 37a arranged between the electrode support 31 and the nozzle support 35 and an elongated projection portion 37b projecting from the insulation portion 37a toward the connection member 19 described below. The insulation portion 37a is formed therein with the above-described through-hole 37c in a manner to extend through a central portion thereof in a thickness direction thereof. The through-hole 37c has a part of the bar-like electrode 29 arranged therein. The insulation portion 37a, as shown in FIGS. 2 and 4, is formed with bolt insertion through-holes 37c to 37i in a manner to extend therethrough in a thickness direction thereof. Of the bolt insertion through-holes 37c to 37i, the bolt insertion through-holes 37c to 37e each have a bolt 43 arranged therein so as to extend from the head-side insulation member 37 to the electrode support 31. The bolt insertion through-holes 37c to 37e each are formed into a configuration which prevents a head of the bolt 43 from being contacted with the nozzle support 35. The head-side insulation member 37 and electrode support 31 are fixed with respect to each other by extending the bolt 43 through each of the bolt insertion through-holes 37c to 37e and threadedly fitting it in each of threaded holes 31d formed in the electrode support 31. Of the bolt insertion through-holes 37c to 37i, the bolt insertion through-holes 37f to 37i, as shown in FIG. 2, each have a bolt 45 arranged there in so as to extend from the head-side insulation member 37 to the nozzle support 35. The bolt insertion through-holes 37f to 37i each are formed into a shape which prevents a head of the bolt 45 from being contacted with the electrode support 31. Thus, the head-side insulation member 37 and nozzle support 35 are fixed with respect to each other by inserting the bolt 45 through each of the bolt through-holes 37f to 37i and threadedly fitting it in each of threaded hole 35g formed in the nozzle support 35. Also, the electrode support 31 is formed at a portion thereof aligned with each of the bolt insertion through-holes 37f to 37i with a screwdriver insertion port 31e in a manner to extend therethrough in a thickness direction thereof so that the bolt 45 may be externally secured by means of the screwdriver.

Figure 6:
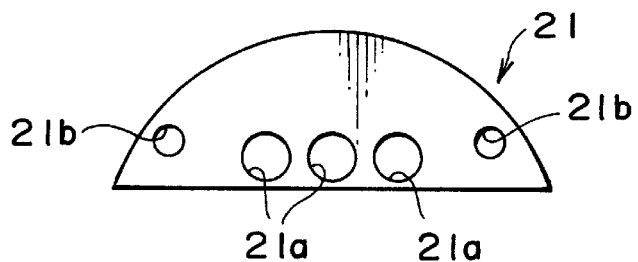
FIG. 6 is a plan view showing a first connection member incorporated in the torch for powder plasma buildup welding of FIG. 1, which is viewed from a side of a torch body.
Figure 7:
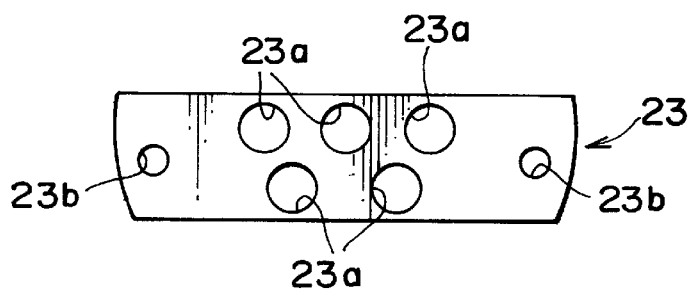
FIG. 7 is a plan view showing a second connection member incorporated in the torch for powder plasma buildup welding of FIG. 1, which is viewed from a side of a torch body.

The connection member 19 is arranged on an end of the torch body 5 defined on a side of the torch head 3 and is constituted by the connection member half 21 and second connection member half 23 each formed of an electrically conductive material of a plate-like shape. The first connection member half 21 and second connection member half 23 are arranged so as to be spaced from each other with a gap or cavity being defined therebetween. The cavity has the projection portion 37b of the head-side insulation member 37 fitted therein. More particularly, the first connection member half 21 and second connection member half 23 are arranged in a manner to be insulated from each other while interposing the projection portion 37b of the head-side insulation member 37 therebetween. The first connection member half 21, as shown in FIGS. 2 and 6, is joined to the electrode support 31 and formed with three feed holes 21a and two connection member-side bolt insertion through-holes 21b in a manner to extend therethrough in a thickness direction thereof. The feed holes 21a each are formed at a lower portion of a central section of the first connection member half 21 and include a fit hole 21c positioned on a side of the torch body 5 and a communication hole 21d positioned on a side of the torch head 3 and formed into a diameter smaller than the fit hole 21c. The fit holes 21c each have each of three pipes 13 of the torch body 5 fitted therein and the communication holes 21d each are arranged so as to communicate with each of the pipes 13 and each of the in-head passages 31a to 31c of the electrode support 31. The second connection member half 23, as shown in FIGS. 2 and 7, is arranged so as to be joined to the nozzle support 35 and formed with six feed holes 23a and two connection member-side bolt insertion through-holes 23b in a manner to extend therethrough in a thickness direction thereof. The feed holes 23a each are formed at a central portion of the second connection member half 23 and include a fit hole 23c positioned on a side of the torch body 5 and a communication hole 23d positioned on a side of the torch head 3 and formed into a diameter smaller than the fit hole 23c. The fit holes 23c each have each of six pipes 15 and 17 of the torch body 5 fitted therein and the communication holes 23d each are arranged so as to communicate with each of the pipes 15 and 17 and each of the in-head passages 35b to 35f.

Figure 8:
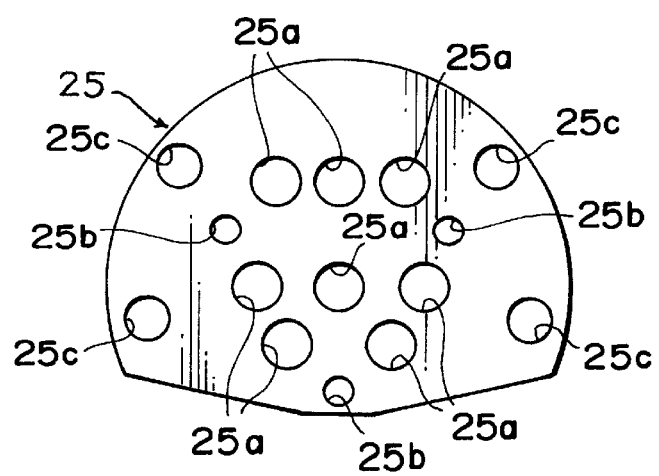
FIG. 8 is a plan view showing an insulation flange incorporated in the torch for powder plasma buildup welding of FIG. 1, which is viewed from a side of a torch body.

The insulation flange 25, as shown in FIGS. 2 and 8, is formed of a ceramic material into a plate-like shape and arranged between the connection member 19 and the torch body 5 or at an end of the torch body 5 defined on a side of the torch head 3. FIG. 8 is a plan view of the insulation flange 25 which is viewed from a side of the torch body 5. The insulation flange 25 is formed with eight flange-side through-holes 25a, three fixing bolt insertion through-holes 25b and four flange-side bolt insertion through-holes 25c so as to extend therethrough in a thickness direction thereof. The flange-side through-holes 25a are arranged rather in proximity to a central portion of the insulation flange 25 and each have each of the eight pipes 13, 15 and 17 arranged therein so as to extend therethrough. The fixing bolt insertion through-holes 25b each include a large-diameter portion 25d positioned on a side of the torch head 3 and a small-diameter portion 25e positioned on a side of the torch body 5. The insulation flange 25 and torch body 5 are fixed with respect to each other by inserting a bolt 47 through each of the fixing bolt insertion through-holes 25b into the torch body 5 and threadedly fitting it in each of threaded holes 11f formed in the torch body 5. More specifically, the bolts 47 each are threadedly fitted in each of the threaded holes 11f while being inserted through each of the large-diameter portions 25e and keeping a head thereof arranged therein. The flange-side bolt insertion through-holes 25c are arranged in a manner to be dispersed on a edge of the insulation flange 25 so as to be aligned with the connection member-side bolt insertion through-holes 21b of the connection member 19. Also, the flange-side bolt insertion through-holes 25c each are so arranged that an opening thereof defined on a side of the torch body 5 is exposed outside the small-diameter end portion 11b of the torch body 5. The flange-side bolt insertion through-holes 25c each include a large-diameter portion 25f positioned on a side of the torch body 5 and a small-diameter portion 25g positioned on a side of the torch head 3. The insulation flange 25, and the first connection member half 21 and electrode support 31 are fixed with respect to each other by inserting each of bolts 49 through two flange-side bolt insertion through-holes 25c positioned on an upper side in FIG. 8 into the first connection member half 21 and electrode support 31 and threadedly fitting it in the threaded hole 31f in the electrode support 31. More specifically, the bolt 49 is threadedly fitted in the threaded hole 31f while extending through the small-diameter portion 25g and the connection member-side bolt insertion through-hole 21b of the first connection member half 21 and keeping a head thereof received in the large-diameter portion 25f. The insulation flange 25, and the second connection member half 23 and nozzle support 35 are fixed with respect to each other by inserting a bolt through each of two flange-side bolt insertion through-holes 25c positioned on a lower side in FIG. 8 into the second connection member half 23 and nozzle support 35 and threadedly fitting it in a threaded hole (not shown) formed in the electrode support 31. Such arrangement permits the communication passages 21d and in-head passages 31a to 31c to communicate with each other and the communication holes 23d and in-head passages 35b to 35f to communicate with each other, resulting in the connection member 19 and torch head 3 being connected to each other. Also, release of the bolts 49 leads to separation of the connection member 19 and torch head 3 from each other. Thus, the bolts 49 permit the torch head 3 to be detachably connected to the torch body 5. This facilitates replacement of the torch head 3, so that only replacement of the torch head 3 is merely required in order to carry out welding in conformity to a size of a pipe material, a configuration thereof and the like. Thus, the present invention eliminates replacement of the whole torch for powder plasma buildup welding which is required in the prior art, to thereby facilitate handling of the powder plasma buildup welding torch. Also, it facilitates repairing of the torch head when it fails or breaks down, because the torch head is detachably arranged. Further, the in-head passages 31a to 31c and 35b to 35f each are provided on a peripheral edge of an opening thereof with an O-ring 51, so that communication regions between the communication holes 21d and 23d and the in-head passages 31a to 31c and 35b to 35f each are sealed with the O-ring 51 compressed due to tightening of the bolt 49.

Figure 9:
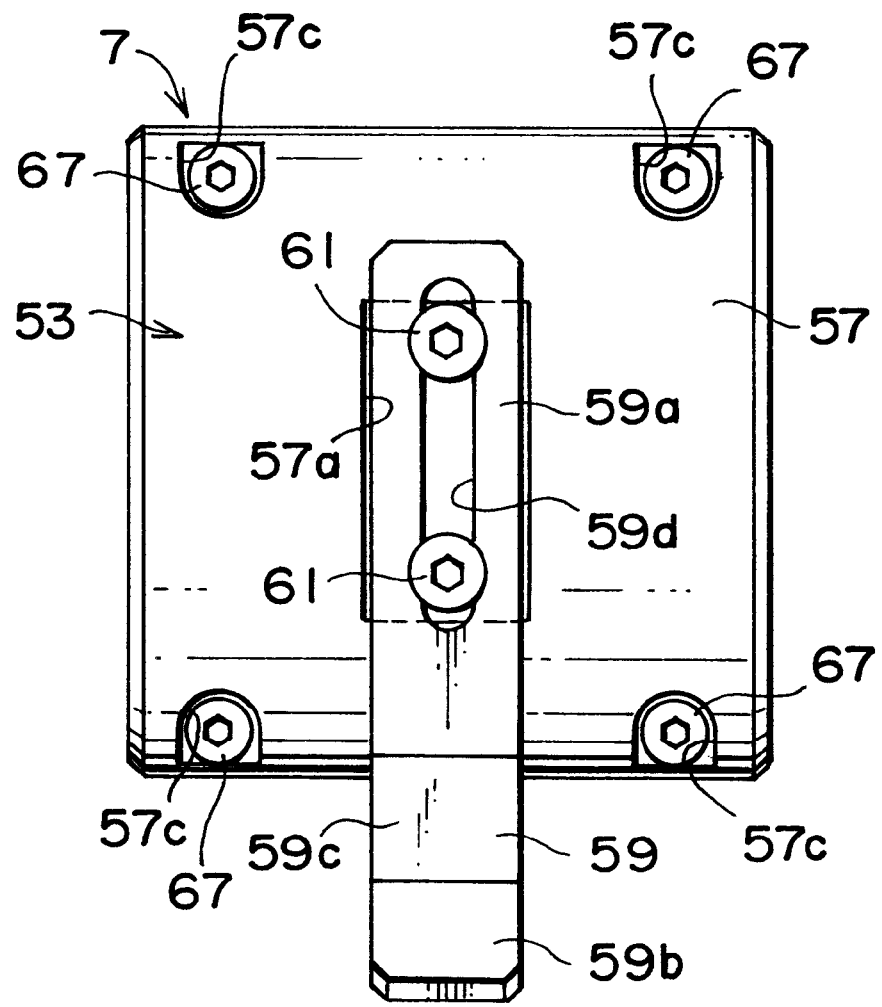
FIG. 9 is a plan view showing a gap formation spacer member incorporated in the torch for powder plasma buildup welding of FIG. 1.
Figure 10:
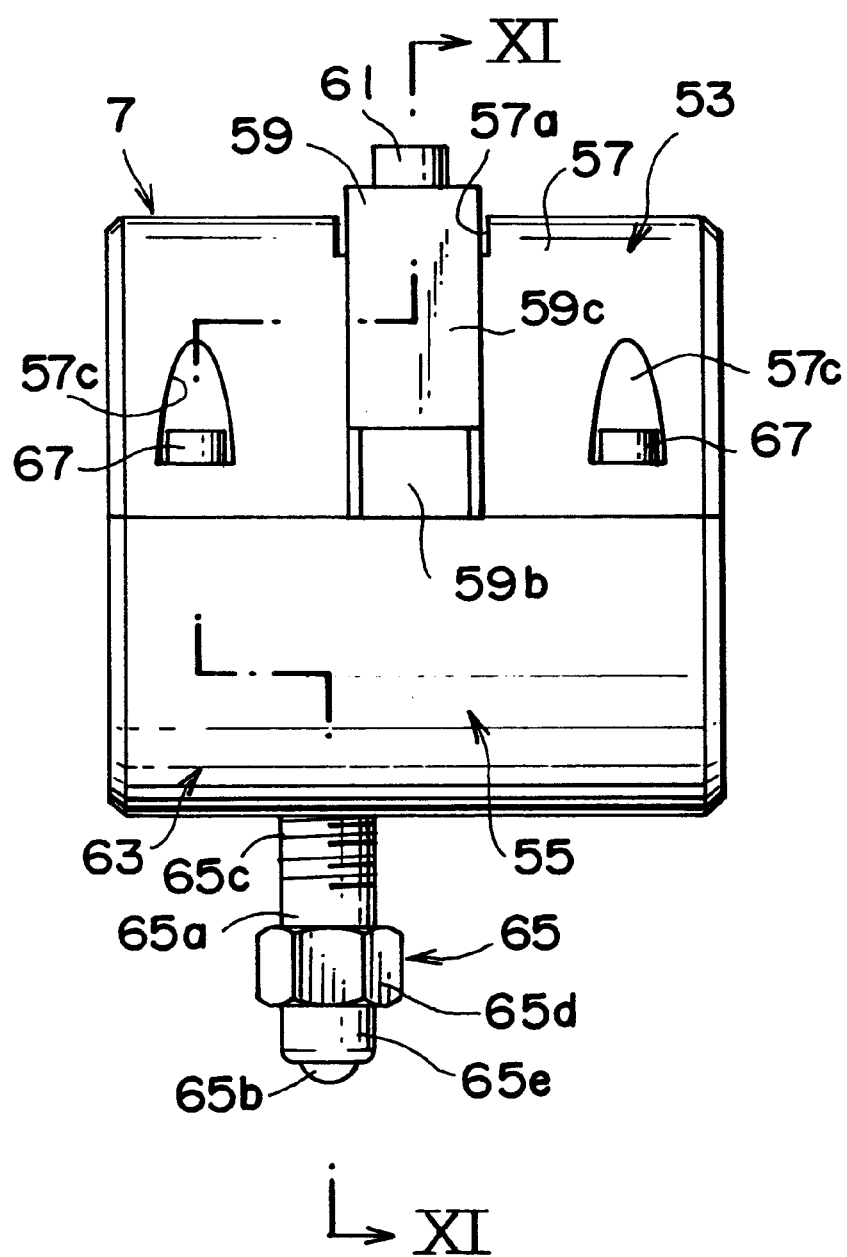
FIG. 10 is a side elevation view showing a gap formation spacer member incorporated in the torch for powder plasma buildup welding of FIG. 1.
Figure 11:
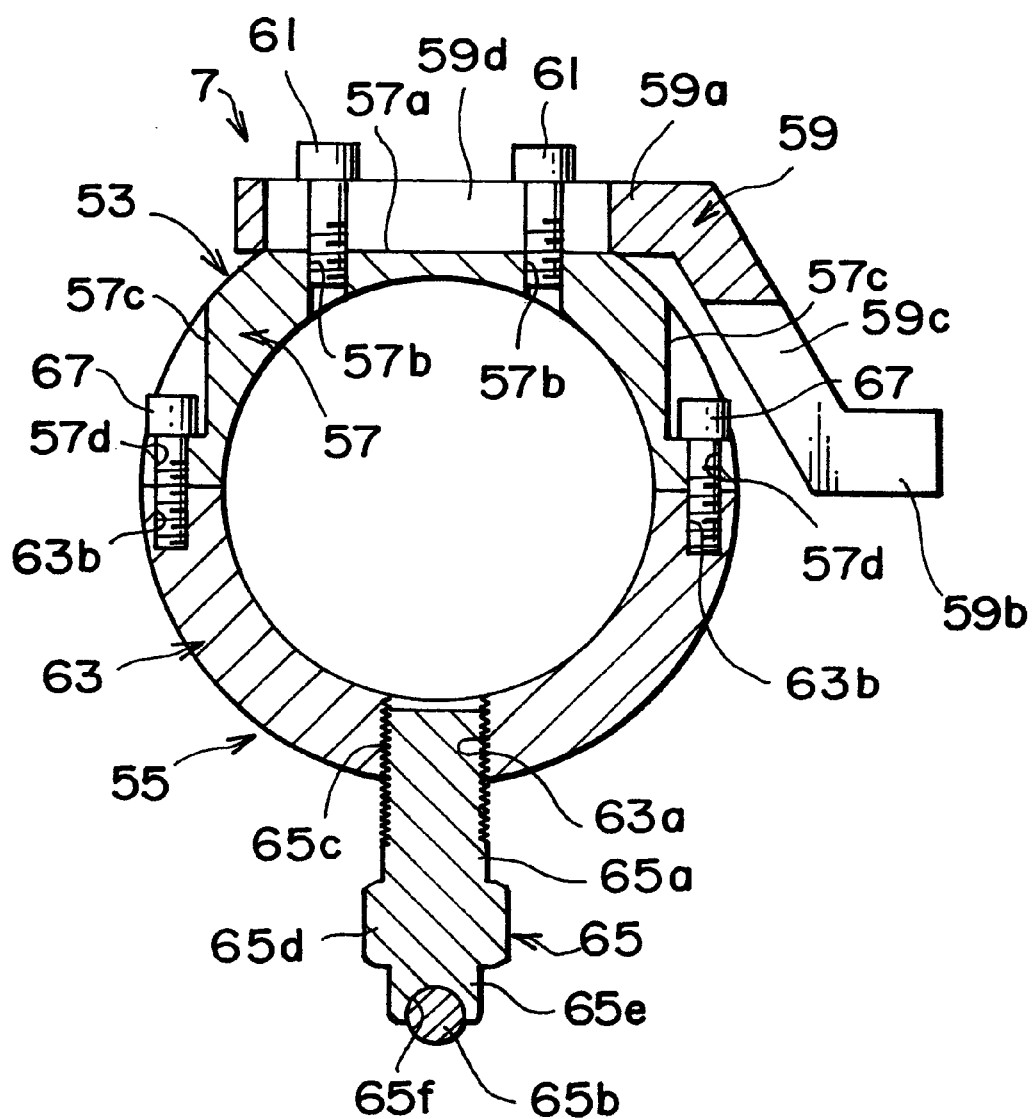
FIG. 11 is a sectional view taken along line XI—XI of FIG. 10.

The gap formation spacer member 7, as shown in FIGS. 1 and 9 to 11, includes an upper head support half 53 and a lower head support half 55 which are combined with each other to circumferentially surround the torch body 5. FIGS. 9 and 10 are a plan view of the gap formation spacer member 7 and a side elevation view thereof, respectively, and FIG. 11 is a sectional view taken along line XI—XI of FIG. 10. The upper head support half 53 is made of brass and includes an upper body section 57 and an upper projection section 59. The upper body section 57 is formed into a semi-circular shape in section so as to circumferentially surround an upper portion of the torch body 5 and includes a groove 57a, two threaded through-holes 57b, four bolt head arrangement grooves 57c and four bolt insertion through-holes 57d. The groove 57a is formed so as to extend in a direction perpendicular to a direction in which the torch body 5 extends and formed so as to be upwardly open. The threaded through-holes 57b each are formed through the upper body section 57 so as to communicate with a bottom of the groove 57a. The bolt insertion through-holes 57d each are formed so as to communicate with an interior of each of the bolt head arrangement grooves 57c and the lower head support half 55.

The upper projection section 59 is formed into an elongated plate-like shape bent at a predetermined angle and includes a supported portion 59a, an abutment portion 59b, and a connection portion 59c for connecting the supported portion 59a and abutment portion 59b to each other therethrough. The supported portion 59a is arranged in the groove 57a and has an elongated through-hole 59d extending therethrough in a thickness direction thereof. The upper projection section 59 is fixed to the upper body section 57 by means of two bolts threadedly fitted via the through-hole 59d in the threaded through-holes 57b of the upper body section 57. The through-hole 59d is formed into a length larger than a distance between the bolts 61 and 61, to thereby be shifted with respect to the bolts 61, to thereby vary a position of the upper projection section 59 with respect to the upper body section 57. The abutment portion 59b is arranged so as to be abutted at an end thereof against an inner peripheral surface of the pipe material P.

The lower head support half 55 is made of a material identical with that for the upper head support half 53 and includes a lower body section 63 and a lower projection section 65. The lower body section 63 is formed into a semi-circular shape in section so as to circumferentially surround a lower portion of the torch body 5 and includes a lower threaded hole 63a and four upper threaded holes 63b. The lower threaded hole 63a is formed through the lower body section 63 so as to be open to a position right below a central portion of the lower body section 63. The upper threaded holes 63b each are formed so as to be open on a side of the upper head support half 53 and be aligned with the bolt insertion through-holes 57d of the upper head support half 53, respectively. The lower head support half 55 is fixed to the upper head support half 53 by means of four bolts 67 threadedly fitted in the upper threaded holes 63b through the bolt insertion through-holes 57d, respectively.

The lower projection section 65 includes a projection body 65a and a ball member 65b. The projection body 65a includes a threaded portion 65c of which an outer periphery is threaded, a tightening operation portion 65d positioned below the threaded portion 65c, and a ball member holding portion 65e arranged below the tightening operation portion 65d. The projection body 65a is fixed to the lower body section 63 in a manner to vertically downwardly project from the lower body section 63 while keeping the threaded portion 65c threadedly fitted in the lower threaded hole 63a of the lower body section 63. The tightening operation portion 65d is formed into a hexagonal shape in cross section so that the threaded portion 65c may be threadedly fitted in the lower threaded hole 63a of the lower body section 63 by means of a suitable tool such as a wrench or the like fitted on the tightening operation portion 65d of the lower projection section 65. The ball member holding portion 65e is formed with a recess 65f of a hemispherical shape which is downwardly open. The recess 65f has the ball member 65b supported therein in a rollable manner or rollably and in such a manner that the ball member 65b is externally exposed at a part thereof. The lower projection section 65 is so arranged that the ball member 65b may be abutted against the inner peripheral surface of the pipe material P. A position of the ball member 65b of the lower projection section 65 with respect to the lower body section 63 may be suitably varied by adjusting a degree at which the threaded portion 65c of the lower projection section 65 is fitted in the lower threaded hole 63a of the lower body section 63. In the illustrated embodiment, a position at which the abutment portion 59b of the upper projection section 59 and the ball member 65b of the lower projection section 65 each are abutted against the inner peripheral surface of the pipe material P is set so as to restrain a variation in distance between the torch head 3 and the inner peripheral surface of the pipe material P. The above-described arrangement of the gap formation spacer member 7 in the illustrated embodiment restrains a reduction in distance between the opening 33a of the convergent nozzle 33 of the torch head 3 and the inner peripheral surface of the pipe material P due to a weight of the torch head 3 and/or deflection of the torch body 5, to thereby ensure that a padding W of a uniform size may be formed on the inner peripheral surface of the pipe material P.

Figure 12:
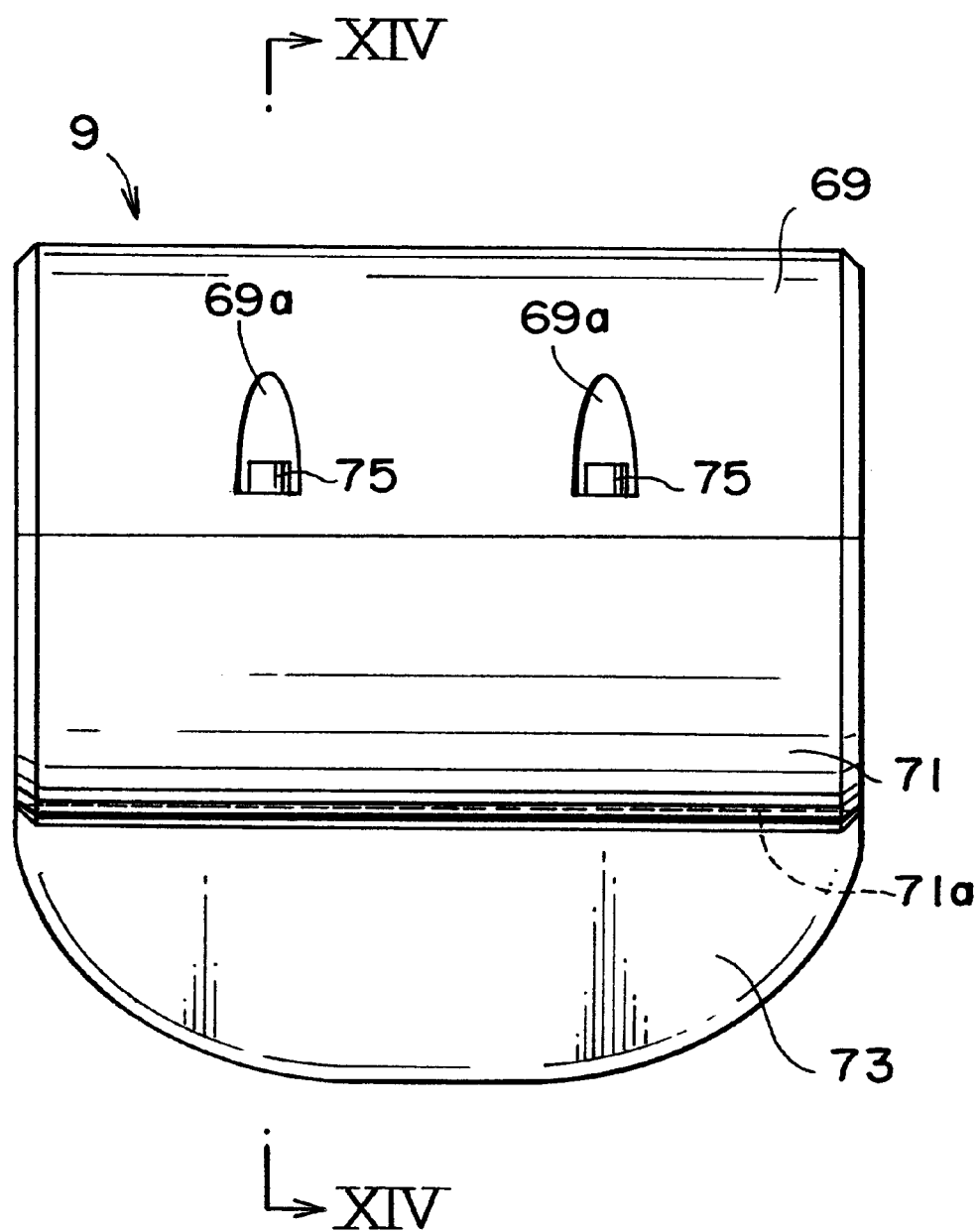
FIG. 12 is a side elevation view showing a deflection restraint spacer member incorporated in the torch for powder plasma buildup welding of FIG. 1.
Figure 13:
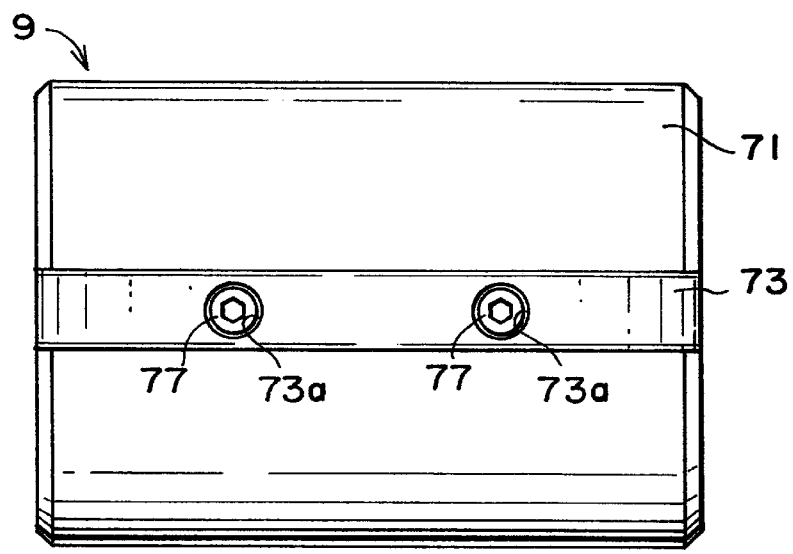
FIG. 13 is a bottom view showing a deflection restraint spacer member incorporated in the torch for powder plasma buildup welding of FIG. 1.
Figure 14:
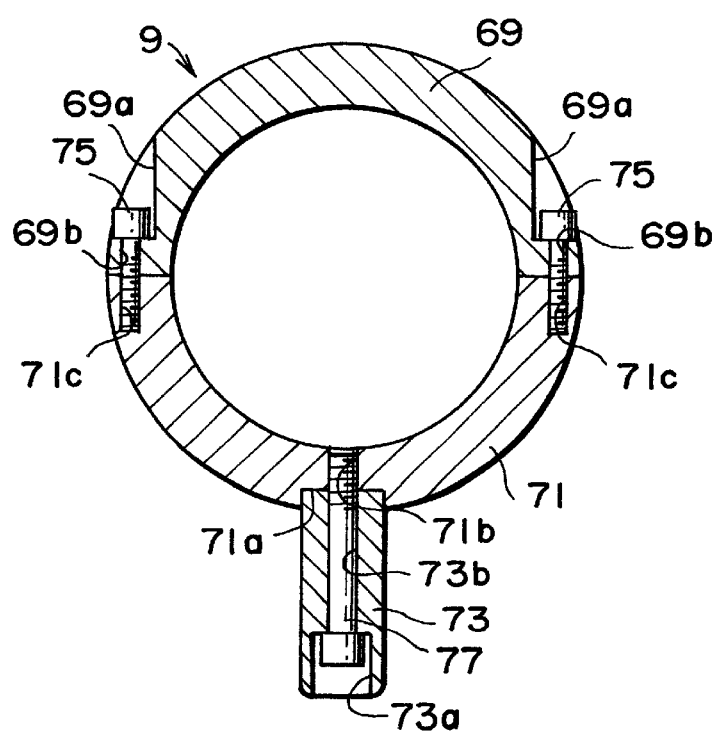
FIG. 14 is a sectional view taken along line XIV—XIV of FIG. 12.

The deflection restraint spacer member 9 is made of brass and, as shown in FIGS. 1 and 12 to 14, includes an upper body support half 69, a lower body support half 71 and an abutment member 73 which are combined with each other to circumferentially surround the torch body 5. FIGS. 12 and 13 are a side elevation view of the gap formation spacer member 7 and a bottom view thereof, respectively, and FIG. 14 is a sectional view taken along line XIV—XIV of FIG. 12. The upper body support half 69 is formed into a semi-circular shape in section so as to circumferentially surround an upper portion of the torch body 5 and includes four bolt head arrangement grooves 69a and four bolt insertion through-holes 69b. The bolt insertion through-holes 69b each are formed so as to communicate with each of the bolt head arrangement grooves 69a and the lower body support half 71.

The lower body support half 71 is formed into a semicircular shape in section so as to circumferentially surround a lower portion of the torch body 5 and includes a groove 71a, two lower threaded holes 71b and four upper threaded holes 71c. The groove 71a is formed so as to extend in a direction in which the torch body 5 extends and be downwardly open. The lower threaded holes 71b each are formed through the lower body support half 71 so as to communicate with a bottom of the groove 71a. The upper threaded holes 71c each are arranged so as to communicate with the upper body support half 69 in a manner to be aligned with each of the bolt insertion through-holes 69b of the upper body support half 69. The lower body support half 71 is fixed to the upper body support half 69 by means of four bolts 75 threadedly fitted in the upper threaded holes 71c through the bolt insertion through-holes 69b, respectively. The abutment member 73 is formed into a substantially semi-circular plate-like shape and so as to extend in a longitudinal direction of the pipe material P. Also, the abutment member 73 is arranged so as to vertically downwardly project from the lower body support half 71, to thereby be abutted against the inner peripheral surface of the pipe material P while being fitted in the groove 71a of the lower body support half 71. Further, the abutment member 73 includes two bolt head arrangement grooves 73a which are formed so as to be downwardly open and two bolt insertion through-holes 73b. The bolt insertion through-holes 73b are arranged so as to communicate with the bolt head arrangement grooves 73a. Also, they communicate with the lower body support half 71 while being aligned with the lower threaded holes 71b of the lower body support half 71. The abutment member 73 is fixed to the lower body support half 71 by means of two bolts 77 threadedly fitted in the lower threaded holes 71b through the bolt insertion through-holes 73b, respectively. The above-described arrangement of the deflection restraint spacer member 9 in the illustrated embodiment effectively prevents the torch body 5 from leaping or jumping in the pipe material P during buildup welding.

Figure 15:
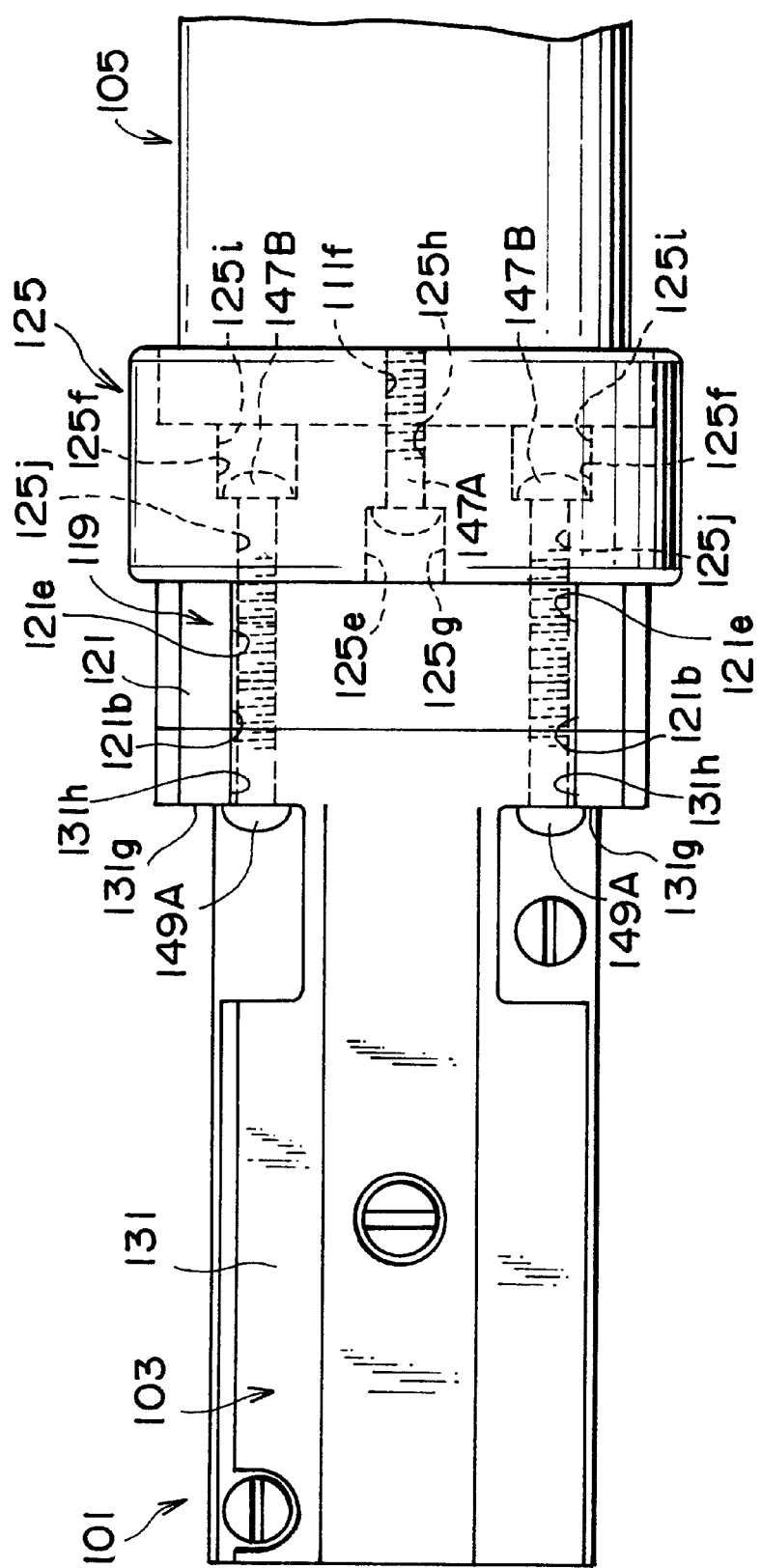
FIG. 15 is a plan view showing a structure around a torch head incorporated in another embodiment of a torch for powder plasma buildup welding according to the present invention.
Figure 16:
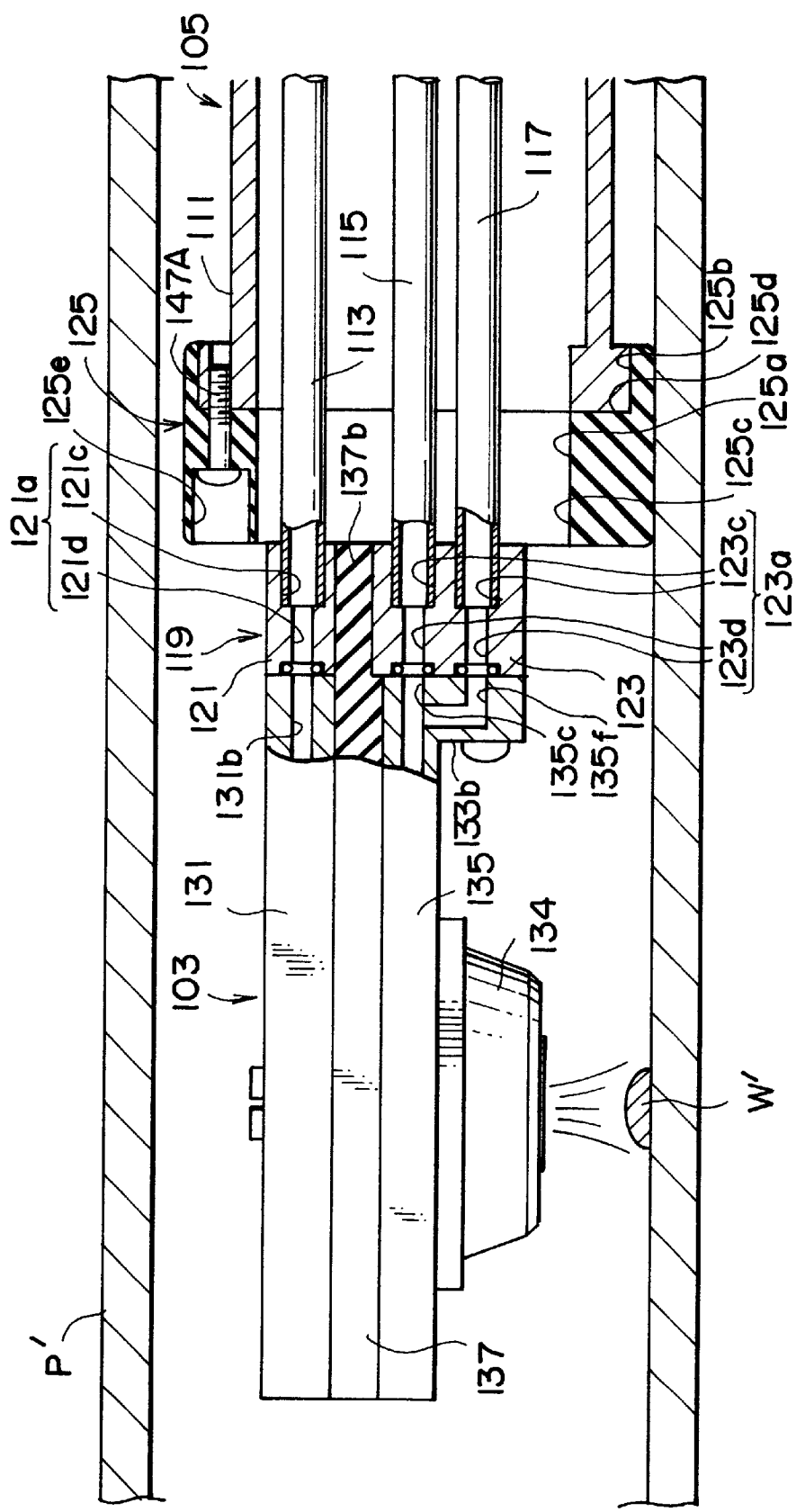
FIG. 16 is a partially broken-away side elevation view of the structure shown in FIG. 15.
Figure 17:
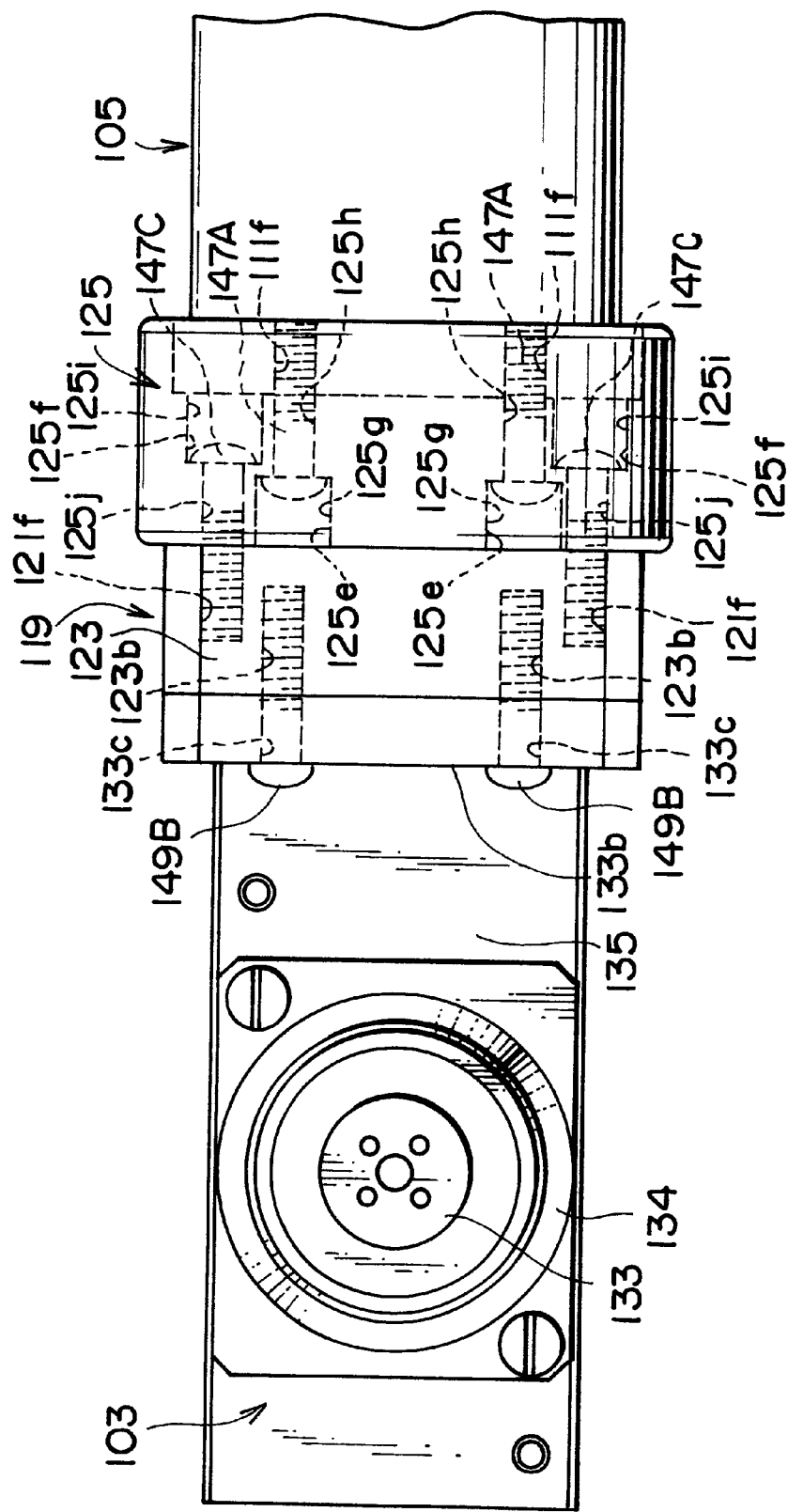
FIG. 17 is a bottom view of the structure shown in FIG. 15.

Referring now to FIGS. 15 to 17, another embodiment of a torch for powder plasma buildup welding according to the present invention is illustrated, wherein FIG. 15 is a plan view showing a peripheral structure of a torch head of a torch of the illustrated embodiment, FIG. 16 is a partially broken-away side elevation view of the torch head and FIG. 17 is a bottom view of the torch head. FIG. 16 also shows a pipe material P' to be subjected to buildup welding. The torch of the illustrated embodiment is constructed so as to carry out connection and separation of a torch head with respect to a connection member by means of bolts inserted therein from a side of the torch head. Also, in the torch of the illustrated embodiment, an insulation flange constitutes a gap formation spacer member. The torch of the illustrated embodiment generally designated at reference numeral 101 is essentially constructed in a manner similar to the torch shown in FIGS. 1 and 2. Thus, the torch 101 includes a torch head 103 and a torch body 105 for connecting a body of a welding machine (not shown) and the torch head 103 to each other therethrough. In the torch of the illustrated embodiment, the torch head 103 and a part of the torch body 105 are inserted into the pipe material P'. Then, the pipe material P' is rotated and the torch head 103 is moved in the pipe material P', resulting in a padding W' of a spiral shape being formed on an inner peripheral surface of the pipe material P', leading to buildup welding. In the illustrated embodiment, the pipe material P' is formed into an inner diameter of 38 mm. The torch body 105, as shown in FIG. 16, includes a connection pipe 111 and pipes 113, 115, 117 . . . arranged in the connection pipe 111 for feeding of a DC current, gas and the like to the torch head 103. In the illustrated embodiment, the torch body 105 is formed into a length of about 4 m. The torch head 103 is connected to the connection pipe 111 through a first connection member half 121 and a second connection member half 123 cooperating with each other to constitute a connection member 119 and through an insulation flange 125. The torch head 103 includes an electrode support 131, a convergent nozzle 133, a nozzle support 135 for supporting the convergent nozzle 133 therein and a head-side insulation member 137. The electrode support 131 is formed therein with a plurality in-head passages such as an in-head passage 131b for plasma gas and the like. The in-head passages are arranged so as to communicate through a communication hole 121d of the first connection member half 121 and the like with the plural pipes in the torch body 105 such as the plasma gas pipe 113 and the like, respectively. Also, a first pipe for feeding cooling water (cooling water feed pipe) which is one of the plural pipes constitutes a first conductive portion electrically connected to a negative electric pole of a DC power supply of a welding machine. This permits a current to be fed to a bar-like electrode in the electrode support 131 through the first cooling water feed pipe (the first conductive portion), the first connection member half 121 and the like.

The convergent nozzle 133 is formed into a substantially cylindrical shape of which a diameter is gradually reduced toward a distal end of the bar-like electrode. The convergent nozzle 133 is supported in the nozzle support 135 so as to surround the bar-like electrode while being kept spaced from the bar-like electrode at a predetermined interval. Also, the convergent nozzle 133 has a shield cap 134 arranged therearound while being threadedly fitted in the nozzle support 135.

The nozzle support 135 is formed therein with a plurality of in-head passages such as an in-head passage 135c for feeding shield gas, an in-head passage 135f for discharging cooling water, and the like. The shield gas in-head passage 135c is arranged so as to communicate through a communication hole 123d of the second connection member half 123 to the shield gas pipe 115 of the torch body 105. The cooling water discharge in-head passage 135f is arranged so as to communicate through the communication hole 123d of the second connection member half 123 with the second cooling water discharge pipe 117 of the torch body 105. A second cooling water feed pipe (not shown) which is one of the plural pipes constitutes a second conductive portion electrically connected to a positive electric pole of the DC power supply of the welding machine. This permits a current to be fed from the positive electric pole through the second cooling feed pipe (the second conductive portion), second connection member half 123, nozzle support 135 and the like to the convergent nozzle 133.

The connection member 119 is constituted by the first connection member half 121 and second connection member half 123. The first connection member half 121 and second connection member half 123 has a gap or cavity formed therebetween, in which a projection portion 137b of the head-side insulation member 137 is fitted. The first connection member half 121 is joined to the electrode support 131 and provided therein with a plurality of feed holes 121a and two threaded holes 121b (FIG. 15). The feed holes 121a and threaded holes 121b each are formed so as to extend through the first connection member half 121 in a thickness direction thereof. The feed holes 121a each include a fit hole 121c positioned on a side of the torch body 105 and a small-diameter communication hole 121d positioned on a side of the torch head 103 and formed into a diameter smaller than the fit hole 121c. The fit holes 121c of the first connection member half 121 have the plural pipes of the torch body 105 fitted therein, respectively, and the communication holes 121d are arranged so as to communicate with the pipes 113 . . . , the in-head passage 131b of the electrode support 131 and the like, respectively. The second connection member half 123 is joined to the nozzle support 135 and includes a plurality of feed holes 123a and two threaded holes 123b (FIG. 17). The feed holes 123a and threaded holes 123b each are formed so as to extend through the second connection member half 123 in a thickness direction thereof. The feed holes 123a each include a fit hole 123c positioned on a side of the torch body 105 and a communication hole 123d positioned on a side of the torch head 103 and formed into a diameter smaller than the fit hole 123c. The fit holes 123c have the plural pipes 115, 117, . . . of the torch body 105 fitted therein, respectively, and the communication holes 123d are arranged so as to communicate with the pipes 115, 117 . . . of the torch body 105, the in-head passages 135c, 135f, and the like, respectively.

In the powder plasma buildup welding torch of the illustrated embodiment, as shown in FIG. 15, the electrode support 131 of the torch head 103 is formed with a plane 131g facing a front of the powder plasma buildup welding torch (on a left side in FIG. 15) and two bolt insertion through-holes 131h open to the plane 131g. The electrode support 131 of the torch head 103 is fixed to the first connection member half 121 of the connection member 119 by means of bolts 149A inserted through the bolt insertion through-holes 131h of the electrode support 131 of the torch head 103 and threadedly fitted in the threaded holes 121b of the first connection member half 121. Also, as shown in FIG. 17, the nozzle support 135 of the torch head 103 is formed with a plane 133b facing the front of the powder plasma buildup welding torch (on a left side in FIG. 17) and two bolt insertion through-holes 133c open to the plane 133b. The nozzle support 135 of the torch head 103 is fixed to the second connection member half 123 by means of bolts 149B inserted through the bolt insertion through-holes 133c and threadedly fitted in the threaded holes 123b of the second connection member half 123. Such fixing between the nozzle support 135 and the second connection member half 123 cooperates with the above-described fixing between the electrode support 131 and the first connection member half 121 to carry out fixing between the torch head 103 and the connection member 119.

Figure 18:
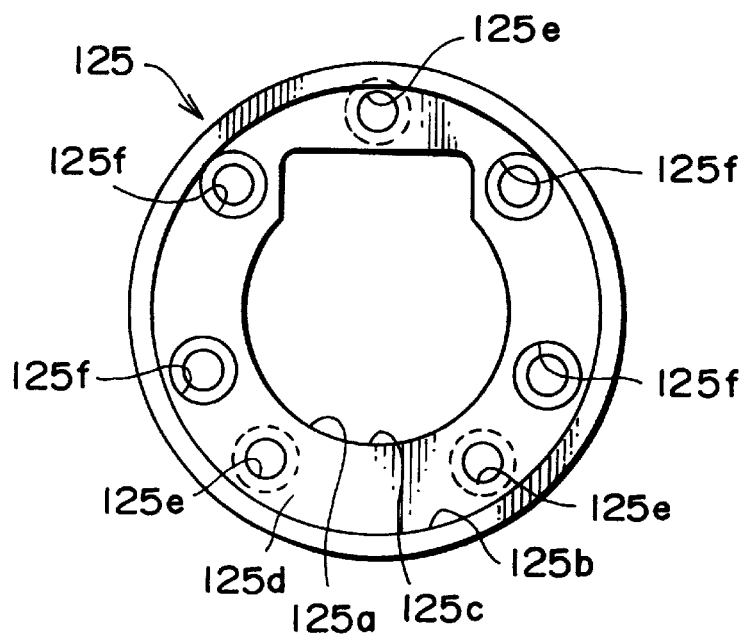
FIG. 18 is a plan view showing an insulation flange incorporated in the torch for powder plasma buildup welding of FIG. 15, which is viewed from a side of a torch body.

The insulation flange 125, as shown in FIGS. 15 to 18, is formed into a cylindrical configuration having a diameter (36 mm) smaller than the-above-described inner diameter (38 mm) of the pipe material P'. FIG. 18 is a plan view of the insulation flange 125 which is viewed from a side of the torch body 105. The insulation flange 125 is abutted at a lower end thereof against the inner peripheral surface of the pipe material P'. Such arrangement permits the insulation flange 125 to act as a gap formation spacer member. The insulation flange 125 has a through-hole 125a formed therein so as to extend through a central portion thereof, in which the plural pipes 113, 115, 117 . . . are arranged. The central through-hole 125a includes a large-diameter portion 125b and a small-diameter portion 125c smaller in diameter than the large-diameter portion 125b, between which a stepped portion 125d is formed. The large-diameter portion 125b has the connection pipe 111 of the torch body 105 fitted therein.

The insulation flange 125 is formed with three first bolt insertion through-holes 125e open to the stepped portion 125d and four second bolt insertion through-holes 125f. The first bolt insertion through-holes 125e, as shown in FIGS. 15 and 17, each include a large-diameter portion 125g positioned on a side of the torch head 103 and a small-diameter portion 125h positioned on a side of the torch body 105. The insulation flange 125 and torch body 105 are fixed to each other by means of bolts 147A inserted from the first bolt insertion through-holes 125e into the torch body 105 and threadedly fitted in threaded holes 111f formed in the torch body 105. More specifically, the bolts 147A each are threadedly fitted in each of the threaded holes 111f while being kept inserted through the small-diameter portion 125h of the first bolt insertion through-hole 125e and keeping a head of the bolt arranged in the large-diameter portion 125g.

The second bolt insertion through-holes 125 each include a large-diameter portion 125i positioned on a side of the torch body 105 and a small-diameter portion 125j positioned on a side of the torch head 103. The insulation flange 125 and the first connection member half 121 of the connection member 119, as shown in FIG. 15, are fixed to each other by means of bolts 147B inserted through the second bolt insertion through-holes 125f positioned at an upper portion of the insulation flange 125 into the first connection member half 121 and threadedly fitted in threaded holes 121e formed in the first connection member half 121, respectively. More specifically, the bolts 147B each are arranged so as to extend through the small-diameter portion 125j of the second bolt insertion through-hole 125f and threadedly fitted in each of the threaded holes 121e of the first connection member half 121 while positioning a head thereof in the large-diameter portion 125i. Also, as shown in FIG. 17, the insulation flange 125 and the second connection member half 123 of the connection member 119 are fixed to each other by means of bolts 147C inserted from the second bolt insertion through-holes 125f positioned at a lower portion of the insulation flange 125 into the second connection member half 123 and threadedly fitted in threaded holes 121f formed in the second connection member half 123. More specifically, the bolts 147C each are inserted through the small-diameter portion 125j of the second bolt insertion through-hole 125f and threadedly fitted in each of the threaded holes 121f of the second connection member half 123 while positioning a head thereof in the large-diameter portion 125i. Thus, the insulation flange 125 and connection member 119 are fixed to each other due to such fixing between the insulation flange 125 and the first connection member half 121 and that between the insulation flange 125 and the second connection member half 123.

Figure 19:
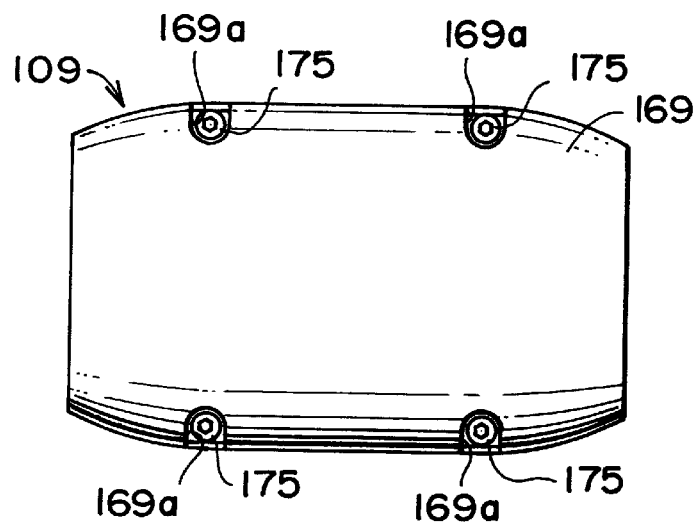
FIG. 19 is a plan view showing a deflection restraint spacer member incorporated in a further embodiment of a torch for powder plasma buildup welding according to the present invention.
Figure 20:
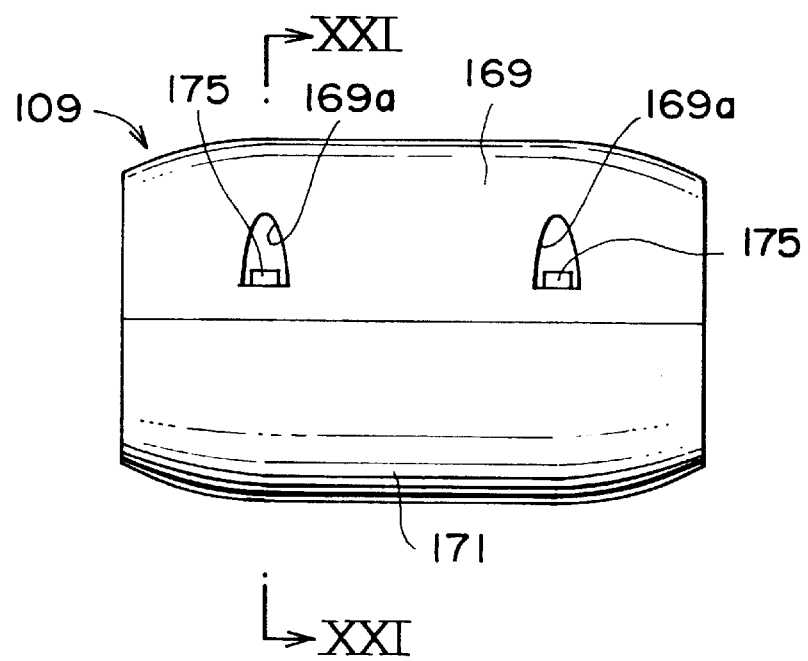
FIG. 20 is a side elevation view showing a modification of the deflection restraint spacer member incorporated in a still another embodiment of a torch for powder plasma buildup welding according to the present invention.
Figure 21:
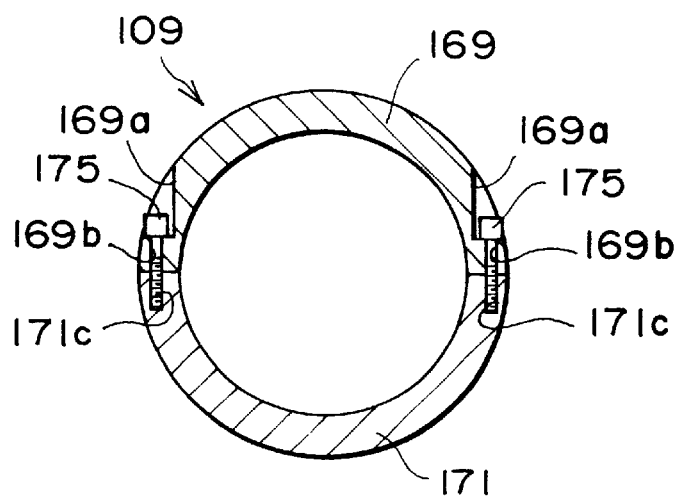
FIG. 21 is a sectional view taken along line XXI—XXI of FIG. 20.

Referring now to FIGS. 19 to 21, a deflection restraint spacer member incorporated in a further embodiment of a torch for powder plasma buildup welding according to the present invention is illustrated, wherein FIG. 19 is a plan view of the spacer member, FIG. 20 is a side elevation view thereof and FIG. 21 is s sectional view taken along line XXI—XXI. The deflection restraint spacer member generally designated at reference numeral 109 includes a first body support half 169 and a second body support half 171 which are combined with each other to circumferentially surround a torch body. The deflection restraint spacer member 109 is formed into a cylindrical shape like a straw bag which is expanded at a central portion thereof. The central expansion thus formed is formed into an outer diameter smaller than an inner diameter of a pipe material and an inner diameter which permits the torch body to be tightly fitted therein. The first body support half 169 is formed into a semi-circular shape in section so as to circumferentially surround an upper portion of the torch body and provided thereon with four bolt head arrangement grooves 169*a* and four bolt insertion through-holes 169*b*. The bolt insertion through-holes 169*b* are formed so as to be open to the bolt head arrangement groove 169*a* and second body support half 171.

The second body support half 171 is formed into a semi-circular shape in section so as to circumferentially surround a lower portion of the torch body and provided with four threaded holes 171*c*. The threaded holes 171*c* are arranged so as to be open to the first body support half 169 while being respectively aligned with the bolt insertion through-holes 169*b* of the first body support half 169. The second body support half 171 is fixed to the first body support half 169 by means of four bolts 175 inserted through the bolt insertion through-holes 169*b* and threadedly fitted in the threaded holes 171*c* of the second body support half 171. In the deflection restraint spacer member 109 thus constructed, the second body support half 171 is abutted at a lower end thereof against an inner peripheral surface of a pipe material, to thereby prevent leaping of the torch body. The gap formation spacer member constituted by the insulation flange 125 shown in FIGS. 15 to 18 and the deflection restraint spacer member 109 shown in FIGS. 19 to 21 may be suitably used for a powder plasma buildup welding torch which carries out buildup welding on an inner peripheral surface of a pipe material having a relatively small inner diameter (about 40 mm or less).

As can be seen from the foregoing, the powder plasma buildup welding torch according to the present invention is so constructed that the torch head is detachably or replaceably connected to the torch body. Such construction permits welding to be attained in conformity to any size of a pipe material to be subjected to welding, any configuration thereof and the like. Thus, the present invention facilitates application of the torch to buildup welding while eliminating replacement of the whole powder plasma buildup welding torch required in the prior art. Also, when any trouble occurs in the torch head, torch head may be readily repaired because it is detachably mounted on the torch body.

Also, arrangement of the gap formation spacer member in the torch effectively prevents a variation in distance between the opening of the convergent nozzle of the torch head and an inner peripheral surface of a pipe material subjected to welding due to a weight of the torch head and/or deflection of the torch body, to thereby ensure that a padding of a uniform size is satisfactorily formed on the inner peripheral surface.

Further, arrangement of the deflection restraint spacer member prevents leaping of the torch body.

While preferred embodiments of the invention have been described with a certain degree of particularity with reference to the drawings, obvious modifications and variations are possible in light of the above teachings. It is therefore to be understood that within the scope of the appended claims, the invention may be practiced other wise than as specifically described.

What is claimed is:

1. A torch for powder plasma buildup welding, comprising:
   a torch head adapted to be inserted into a pipe material of a continuous length to carry out buildup welding on an inner peripheral surface of the pipe material; and
   a torch body formed into a continuous length and having said torch head mounted on a distal end thereof;
   said torch head being replaceably connected to said torch body,
   wherein said torch head includes a convergent nozzle having an opening; and
   either said torch head or said torch body is provided with a gap formation spacer member which is abutted against the inner peripheral surface of the pipe material to keep a distance between said opening of said convergent nozzle of said torch head and the inner peripheral surface of the pipe material substantially constant during welding,
   wherein said torch body is provided with at least one deflection restraint spacer member adapted to be abutted against the inner peripheral surface of the pipe material so as to prevent deflection of said torch body in the pipe material during buildup welding.

2. A torch for powder plasma buildup welding, comprising:
   a torch head adapted to be inserted into a pipe material of a continuous length to carry out buildup welding on an inner peripheral surface of the pipe material;
   a torch body formed into a continuous length and having said torch head mounted on a distal end thereof;
   said torch body including a connection pipe and a plurality of pipes arranged in said connection pipe, said plurality of pipes feeding cooling water, gas and the like to said torch head, respectively;
   said plurality of pipes include two or more pipes made of an electrically conductive material;
   one of said two or more pipes constitutes a first conductive portion electrically connected to one of electric poles of a DC power supply and another of said two or more pipes constitutes a second conductive portion electrically connected to the other of said electric poles;
   said torch head including a bar-like electrode, an electrode support made of an electrically conductive material and arranged for supporting said bar-like electrode, a convergent nozzle made of an electrically conductive material, a nozzle support made of an electrically conductive material and arranged for supporting said convergent nozzle, and a head-side insulation member arranged between said electrode support and said nozzle support to electrically insulated said electrode support and nozzle support from each other;
   said head-side insulation member including a projection portion projecting beyond said electrode support and nozzle support and toward said torch body;
   said connection pipe of said torch body being fixedly provided on an end thereof defined on a side of said torch head with an insulation flange; and
   said insulation flange being attached with a connection member including a first connection member half and a second connection member half being arranged so as to be spaced from each other through a cavity defined therebetween and fitted with said projection portion;
   said one of said two or more pipes being connected with said first connection member half through said insulating flange;

said another of said two or more pipes being connected with said second connection member half through said insulating flange;

said electrode support being contacted with said first connection member half;

said nozzle support being contacted with said second connection member half;

said torch head being replaceably connected to said torch body by means of a plurality of bolts for fixing said torch head and connection member to each other.

3. A torch as defined in claim 2, wherein said connection member being attached with said insulation flange by means of said bolts for fixing said torch head and connection member to each other.

4. A torch as defined in claim 3, wherein said first connection member half and said second connection member half each are formed with a plurality of connection member-side bolt insertion through-holes;

said flange is formed with a plurality of flange-side bolt insertion through-holes aligned with said connection member-side bolt insertion through-holes, respectively;

said flange-side bolt insertion through-holes each include a large diameter portion receiving therein each head of the bolts and a small diameter portion receiving therein each shank of the bolts;

said electrode support and said nozzle support each are formed with a plurality of threaded holes aligned with said connection member-side bolt insertion through-holes, respectively; and said torch head is replaceably connected to said torch body by means of said bolts threadedly fitted in said threaded holes through said connection member-side bolt insertion through-holes and flange-side bolt insertion through-holes.

5. A torch ad defined in claim 2, wherein said insulation flange is formed with flange-side through-holes via which said pipes of said torch body extend;

said connection member is formed with fit holes which communicate with said flange-side through-holes and in which said pipes are fitted and communication holes which communicate with said fit holes and are open on a side of said torch head;

said torch head is formed with in-head passages aligned with said communication holes; and said torch head is connected to said torch body so that said communication holes and in-head passages communicate with each other at a communication portions therebetween.

6. A torch as defined in claim 5, wherein each of said communication portions is sealed with an O-ring which is arranged at an opening of said communication hole on a side of said torch head or an opening of said in-head passage on a side of said connection member.

7. A torch as defined in claim 2, wherein said torch body is provided on an end thereof defined on a side of said torch head with a gap formation spacer member;

said gap formation spacer member being abutted against the inner peripheral surface of the pipe member so as to keep a distance between an opening of said convergent nozzle of said torch head and the inner peripheral surface of the pipe material substantially constant during welding.

8. A torch as defined in claim 7, wherein said gap formation spacer member includes an upper head support half and a lower head support half which are combined with each other to circumferentially surround said torch body;

said lower head support half including a lower body portion for circumferentially surrounding a lower portion of said torch body and a lower projection portion arranged so as to vertically downwardly project from said lower body portion, resulting in being abutted against the inner peripheral surface of the pipe material;

said upper head support half including an upper body portion for circumferentially surrounding an upper portion of said torch body and an upper projection portion arranged so as to project from said upper body portion in an radial direction of the pipe body, resulting in being abutted against the inner peripheral surface of the pipe material;

said upper projection portion having, to said lower projection portion, positional relationship which is set to retrain a variation in distance between said torch head and the inner peripheral surface of the pipe material during welding.

9. A torch as defined in claim 8, wherein said lower projection portion includes a projection body threadedly coupled to said lower head support half and a ball member rollably supported in said projection body so as to be abutted against the inner peripheral surface of the pipe material.

10. A torch as defined in claim 2, wherein said insulation flange is formed into a cylindrical configuration and constitutes said gap formation spacer member.

11. A torch as defined in claim 7, wherein said torch body is provided with at least one deflection restraint spacer member;

said deflection restraint spacer member being abutted against the inner peripheral surface of the pipe material so as to prevent deflection of said torch body in the pipe material during buildup welding.

12. A torch as defined in claim 11, wherein said deflection restraint spacer member includes an upper body support half and a lower body support half which are combined with each other to circumferentially surround said torch body, as well as an abutment member arranged so as to vertically downwardly project from said lower body half, resulting in being abutted against the inner peripheral surface of the pipe material.

13. A torch as defined in claim 12, wherein said abutment member is formed into a plate-like shape and arranged so as to extend in a longitudinal direction of the pipe material.

14. A torch as defined in claim 11, wherein said deflection restraint spacer member is constituted by a cylindrical member;

said cylindrical member including a first body support half and a second body support half which are combined with each other to circumferentially surround said torch body.

* * * * *